Figure 1:
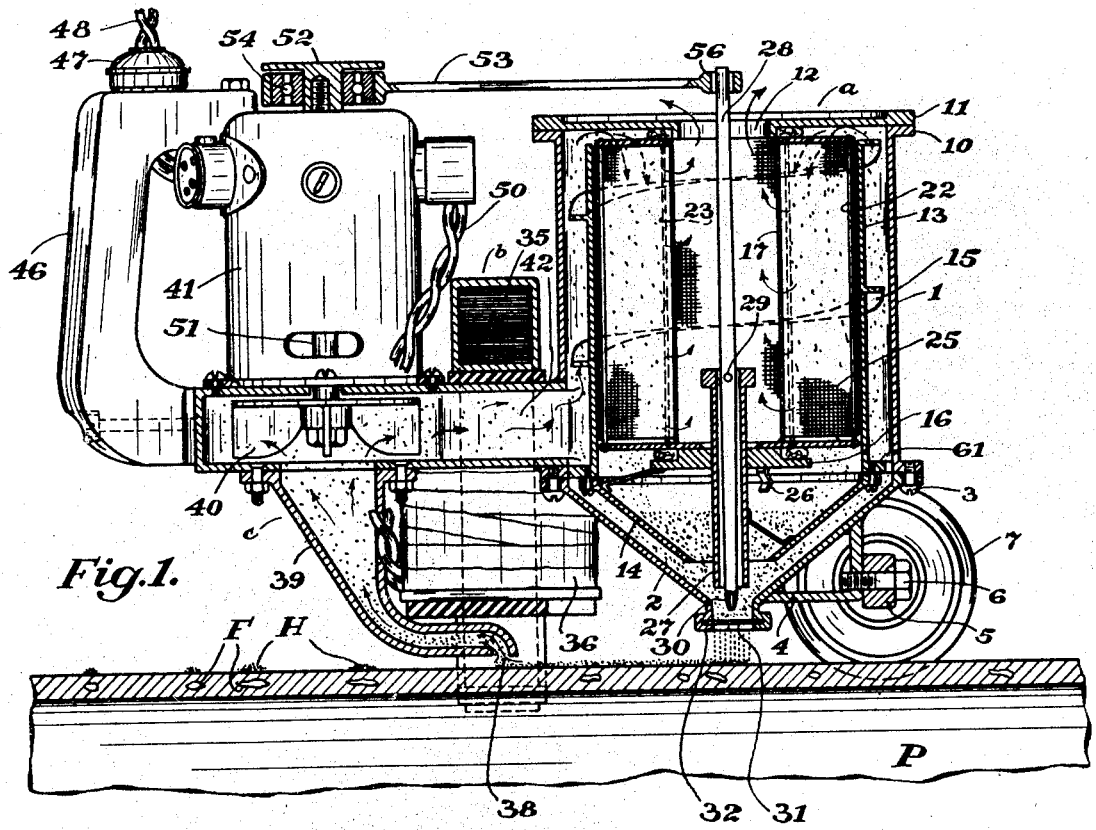

Oct. 13, 1936. R. H. EURICH ET AL 2,057,091

METHOD OF AND APPARATUS FOR MAGNETIC TESTING

Filed Aug. 4, 1933 2 Sheets-Sheet 1

INVENTOR.
RICHARD H. EURICH,
RICHARD AUBREY, JR.
BY
ATTORNEY.

Oct. 13, 1936.  R. H. EURICH ET AL  2,057,091

METHOD OF AND APPARATUS FOR MAGNETIC TESTING

Filed Aug. 4, 1933  2 Sheets-Sheet 2

INVENTOR.
RICHARD H. EURICH,
RICHARD AUBREY, JR.
BY
ATTORNEY.

Patented Oct. 13, 1936

2,057,091

UNITED STATES PATENT OFFICE 2,057,091

METHOD OF AND APPARATUS FOR MAGNETIC TESTING

Richard H. Eurich and Richard Aubrey, Jr., Youngstown, Ohio, assignors to The Youngstown Sheet and Tube Company, Youngstown, Ohio, a corporation of Ohio Application August 4, 1933, Serial No. 683,598

15 Claims. (Cl. 175—183)

Our invention comprises an improved method of and apparatus for producing visible indications of the character and structure of metal with the aid of a magnetic flux passed therethrough and is particularly useful in testing welded seams in ferrous pipes, tubes and other articles in which a knowledge of the distribution and relative density of different portions of the weld metal is of importance in determining the soundness of the weld and its freedom from subsurface flaws and defects.

When a magnetic flux passes through a metal body the magnetic lines are deflected at some places and concentrated at others to a greater or lesser extent as a result of irregularities in the density of the material caused by non-uniform solidification during its manufacture, inclusions of foreign matter, discontinuity of structure, gas holes, and/or other flaws and imperfections. This phenomenon has heretofore been utilized in testing metal by passing a magnetic flux through the part to be tested either subsequent to or concurrently with the dusting thereon of a paramagnetic powder, such as pulverized magnetite, fine iron filings or the like, the particles of which become arranged under the influence of magnetic flux in patterns which are roughly indicative of the direction and relative numbers of magnetic lines flowing through the subjacent portions of the material and our invention is predicated thereon.

It is therefore an object of our invention to provide an improved machine for automatically and continuously dusting a substantially uniform layer of para-magnetic or other suitable powder onto progressive areas on the surface of a body to be tested and thereafter progressively subjecting said areas to a magnetic flux effective to arrange the powder in patterns indicating the direction and relative density of the magnetic lines of force created in the body during the passage of the machine over its surface.

A further object of the invention is to provide in apparatus of the character aforesaid automatic means for removing from the surface of the body while it is being subjected to magnetic flux a portion of the powder previously dusted thereon whereby areas from which relatively dense magnetic flux is absent are freed of the powder while that disposed adjacent areas through which the flux is relatively dense is retained thereon to serve subsequently as an indication of the location of such areas.

Another object of our invention is the provision of a novel method of testing materials which is particularly advantageous and useful for testing welded seams and adjacent parts of iron and steel pipes, tubes, and other articles, the said method being preferably practised with the aid of the apparatus of our invention although other apparatus may be employed for its performance, if desired.

Still further objects, advantages, operations and novel features of design, construction and arrangement comprehended by the invention will hereinafter more fully appear or will be understood from the following description, in which reference will be made to the accompanying drawings, of a machine constructed in accordance therewith, and which, as stated, is well suited for the performance of the method which it comprises.

Figure 2:
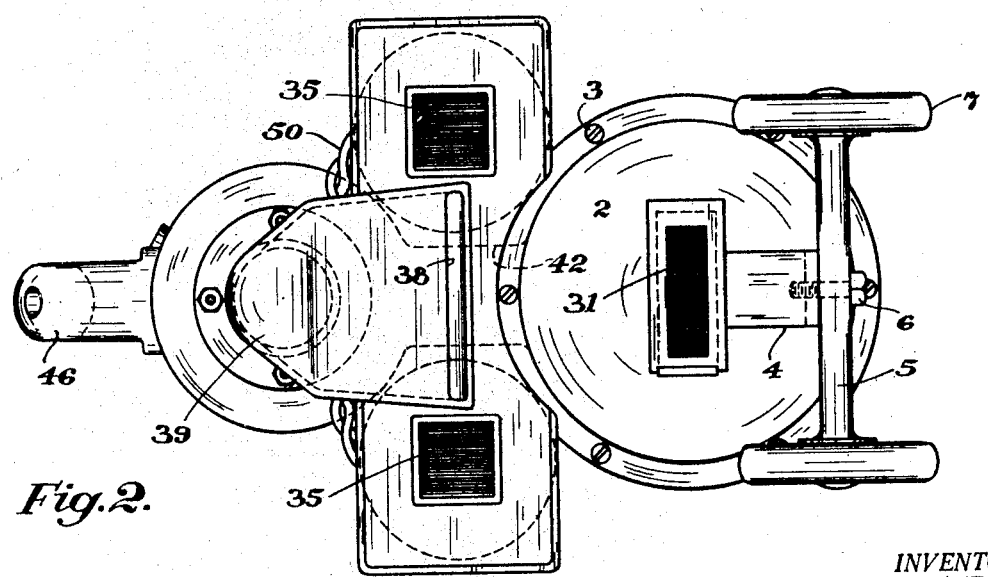
Figure 3:
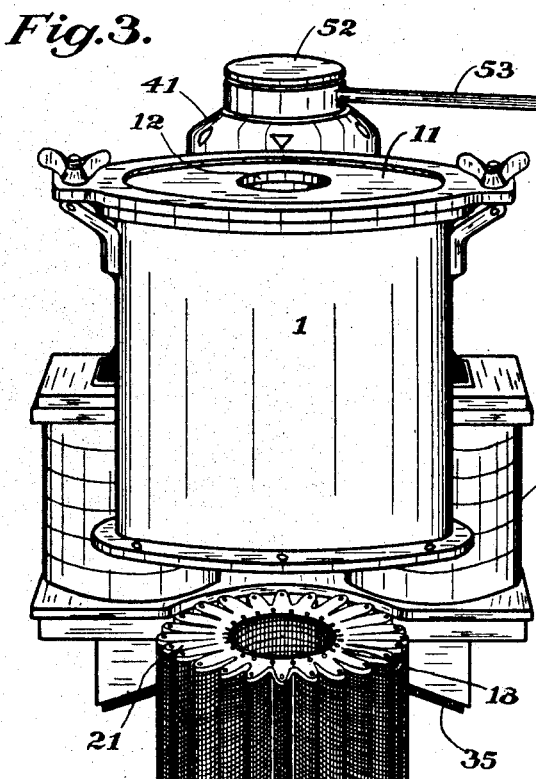
Figure 4:
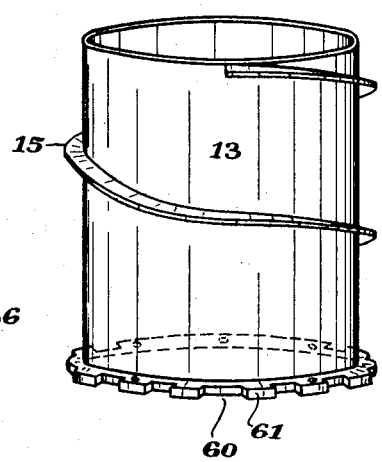
Figure 5:
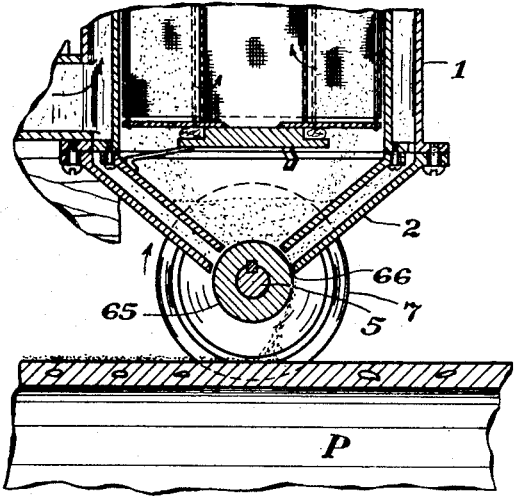
Figure 5:
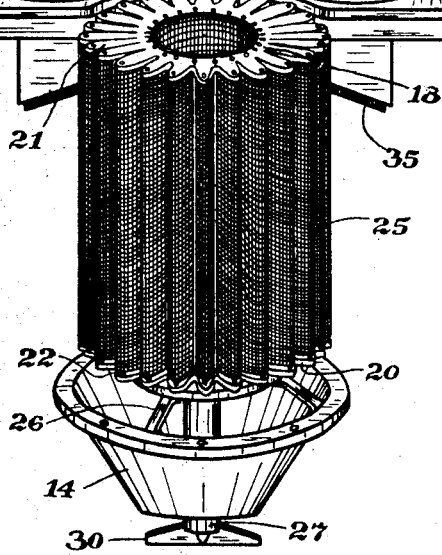
Figure 5:
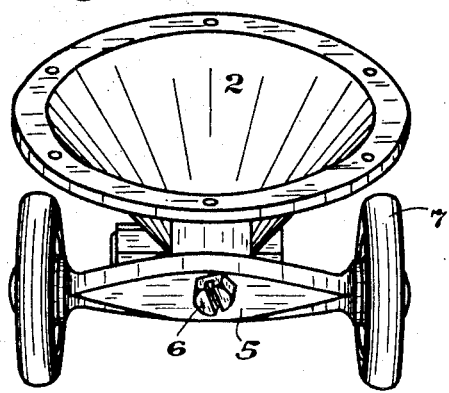

In the said drawings, Fig. 1 is a side elevation partly in vertical section of the machine operatively disposed for testing a typical welded pipe shown in fragmentary vertical section and Fig. 2 is a bottom plan view of the machine. Fig. 3 is a composite, front perspective view of certain parts of the machine shown in the preceding figures but separated for clearness of illustration, and Fig. 4 is a perspective view of the baffle cylinder forming another part thereof. Fig. 5 is a fragmentary vertical section of a modified form of powder distributor which, under some circumstances, may preferably be employed. In the several figures like characters are used to designate the same parts.

Referring now more particularly to the drawings, the machine comprises three operative units each having an individual function yet conjointly contributing to the operation of the machine as a whole. These units may be designated generally as (a) the powder separator and distributor; (b) the magnetic flux generator, and (c) the suction unit.

The powder collector and distributor $a$ is preferably disposed at the front part of the machine, considered in the direction in which it is moved during the testing operation, and comprises a substantially cylindrical housing 1 having an inverted conical base 2 open at its apex and secured to the housing by bolts 3 or otherwise, the base being supported through the medium of a bracket 4 from an axle 5 secured at its midpoint to the bracket by means of a horizontally disposed bolt 6, the axle, which is preferably capable of oscillation about the bolt, having rubber tired or other suitable wheels 7 rotatably disposed at its ends. The upper end of the housing 1 is provided with a radially extending flange 10 on which is disposed a top or cover 11 having at its center a circular opening or port 12 which provides an outlet for air forced into the housing from the suction unit c as will hereinafter appear. Disposed within the housing and coaxial therewith is a baffle cylinder 13 terminating in an inverted conical base 14 provided with a radially outwardly extending spiral fin 15 spaced slightly short of the inner surface of the housing 1 when assembled therein and thus forming a spiral passageway between the baffle cylinder and the housing the turns of which intercommunicate through the clearance between the fin and the inner surface of the latter. The housing 1 and cylinder 13, as well as the fin, 15 are preferably made of thin metal or other suitable material and provide an inclosure for a metal cage 16 carrying a screen or filter for removing the para-magnetic dust from the current of air introduced thereinto. This cage comprises an inner cylinder 17 formed of wire cloth or other suitable screening material supported from relatively stiff rings 18 disposed at its extremities and respectively having radial outwardly projecting arms 20 and 21. Between the outer ends of each pair of these arms a rod 22 extends parallel to the axis of the cage while like rods 23 are disposed adjacent the cylinder in the spaces between the arms and similarly extend from the top to the bottom of the cage, a wire cloth labyrinth 25 being secured to and supported from the rods 22 and 23 with its lower edge slightly spaced above the arms 21 to permit escape of powder from its interior.

The cage 16 is supported from the conical base 14 of the baffle 13 through the medium of a plurality of spider arms 26 and in turn affords support to a sleeve 27 extending axially thereof and adjacent the upper end of which is pivoted an agitator arm 28. One end of the latter projects upwardly through the exhaust port 12 for connection with its actuating mechanism, the pivot 29 permitting limited oscillation of the arm in a vertical plane, while a fin 30 is secured to its opposite end a short distance above a dusting screen 31 disposed over the opening at the bottom of the housing base. This screen may preferably be made removable as by slidably mounting it in ways 32 secured to the base, thus enabling screens of different sized mesh to be readily utilized. As indicated in Fig. 1, when the hopper formed by the base 2 and the screen is supplied with a quantity of para-magnetic or other suitable powder, oscillation of the arm 28 and fin 30 agitates the material and causes limited quantities thereof to pass through the screen 31 for deposition in a substantially uniform layer approximately the width of the screen on the surface of the subjacent pipe P or other body being subjected to test.

Disposed immediately behind the powder collector and distributor is the flux generator b comprising an electromagnet 35, preferably in the form of an inverted U, having coils 36 connected in series or in parallel and respectively surrounding its arms so that when a current is passed through the coils a strong magnetic flux is generated in the magnet, the ends of its arms forming opposite magnetic poles. The magnet, as shown, is preferably made of relatively thin sheets of magnetic material, high silicon steel or other metal having high magnetic permeability and low hysteresis being particularly desirable for this purpose as it tends to enhance the density of the magnetic flux between the poles of the magnet and hence through the article being tested when the latter contacts therewith during the test.

The suction unit c disposed at the rear of the magnet includes a suction nozzle 38 projecting forwardly between the poles of the magnet and suitably adjusted vertically to provide a clearance above the article being tested, a duct 39 in which is interposed a centrifugal or other suitable fan 40 communicating with the nozzle so that a current of air is continuously drawn through the suction nozzle when the fan is being operated, an electric motor 41 supported from the fan casing for providing the motive power for the fan, and an outlet duct 42 interconnecting the fan chamber with the spiral passageway between the baffle cylinder 14 and housing 1. This duct is preferably made of relatively heavy metal welded or otherwise secured to both the housing 1 and the casing of the fan 40 and thus not only supports the magnet 35 but serves to retain all the units in rigid operative assembly in the machine.

A suitable hand grip 46 secured to the motor housing is provided for manually guiding the machine, and a plug and socket 47, conveniently disposed thereon, permits electrical connection by means of a cord 48 with a source of energy, the same source of current being utilized both for driving the motor and for energizing the magnet coils 36 through the medium of the leads 50.

A bushing 52 is eccentrically mounted on the upper end of the motor shaft 51 and surrounded by an annular boss on the adjacent end of an actuating arm 53, anti-friction bearings 54 being desirably interposed between the parts, the opposite forwardly projecting end of the arm 53 being enlarged as at 56 and apertured to loosely receive the upwardly extending end of the agitator arm 28. Thus, when the motor is operating, the arm 53 is reciprocated longitudinally of the machine as a result of eccentric rotation of the bushing 52 and the shaft 28 is therefore correspondingly oscillated in a vertical plane thereby actuating the agitator fin 30 to discharge powder through the screen 31.

The operation of the machine just described is substantially entirely automatic since after the current is turned on it is merely pushed forward over the area to be tested and as the wheels 7 support the principal portion of its weight when it is being moved, but little effort and attention is required to properly guide it over the desired area when the magnet is deenergized or substantially so.

Since energization of the magnet 35 causes it to adhere very tenaciously to the body on which the machine is disposed, provided it be magnetic in character, we generally prefer to use an alternating or pulsating current, for when such a current, on which the motor is of course designed to operate continuously, is employed, the magnet releases its hold momentarily with each reversal or pulsation, so that by a mere steady pressure on the hand grip 46 the operator can readily move the machine forward a short distance each time the current phase changes. Moreover, with a current of this character, the powder particles tend to arrange themselves more rapidly when subjected to the influence of the magnetic flux due, probably, to a vibrating effect generated by the alternating or pulsating action. However, we have found that the magnetic flux induced by such a current tends to penetrate less deeply into the material than that induced by a direct current so that for testing relatively thick material or when testing for deep-lying defects, a direct current would be preferable were it not for its tendency to prevent the machine from being conveniently moved. Consequently, as a practical compromise between the advantages inherent in the use of alternating or pulsating current on one hand and direct current on the other, we prefer, under average conditions, to employ an alternating current of low frequency, for example, of about 25 cycles per second, as such a current gives good flux penetration, is generally commercially available and since it releases and renews the grip of the magnet approximately fifty times per second the machine can be manually moved over the article being tested with relatively little effort.

It will now be apparent that during the forward movement of the machine in the course of a test a substantially uniform layer of magnetic powder is constantly being discharged upon the body being tested from the screen 31 as a result of the oscillation of the agitator 30, that the portion of the body upon which the powder has been deposited is progressively subjected to magnetic flux and that a relatively strong current of air is continuously being drawn into the suction nozzle through the operation of the fan. Moreover, the speed of the motor 41 and the capacity of the fan 40 are desirably so proportioned to the strength of the magnet 35 that the current of air drawn by the fan through the nozzle 38 is just sufficiently strong to draw with it from the body being tested and into the nozzle only such of the particles of para-magnetic or other powder as have not been collected together in relatively compact masses under the influence of an area of relatively dense magnetic flux created in the body through the operation of the magnet. It will be understood that the areas of relatively great magnetic flux which cause segregation of these masses ordinarily result from irregularities or flaws F in the internal structure of the body being tested, for, as the magnetic field is locally intensified near the surface of the body adjacent such flows, particles of the powder are drawn more closely thereto and held thereagainst more strongly in such areas of intensification than at other parts of the surface and thus become concentrated there in relatively large heaps. Some portion of each such heap is therefore retained upon the body during and after removal of particles from said other parts through the suction nozzle by means of the air current described.

These heaps of powder H may thus readily be observed after passage of the machine, at which time they may be more permanently marked and designated or otherwise treated in accordance with any desired practice, the presence of a heap of powder at any point clearly indicating some condition within the metal such as a flaw, a knowledge of which is extremely valuable in determining the quality of the article.

The particles of dust which are drawn into the suction nozzle are carried with the current of air impelled by the fan through the ducts 39 and 42 and into the housing 1. The said current is here constrained by the fin 15 to traverse a spirally upward course as a result of which the heavier, coarser dust particles are thrown outwardly against the inner surface of the housing from which point they then descend to the bottom of the passage, falling, if necessary, between the outer edge of the fin 15 and the adjacent wall of the housing 1 through the clearance provided for the purpose and thence through spaced slots 60 in the flange 61 of the baffle cylinder 14 into the hopper at the bottom of the housing, from which they are subsequently again discharged through the screen 31.

The lighter, finer particles are carried upwardly with the air current to the end of the spiral passage and thence downwardly between adjacent convolutions of the screen 25, the air carrying them passing through the screen 25 and the screen 18 for exhaustion to the atmosphere through the aperture 12 in the top of the housing. The particles adhering to the screens, however, fall from time to time into the hopper as a result of their own weight or because of the vibration of the machine and are there mixed with the larger particles and similarly reused.

In the powder distributor illustrated in Fig. 5 of the drawings, we substitute for the bracket 4 a pair of suitable brackets, not shown, respectively mounted on opposite sides of the center line of the machine in substantial alignment with the transverse central plane of the housing 1, the axle 5 on which the wheels 7 are carried being secured thereto. A knurled drum 65 is keyed to the axle for rotation therewith and partially projects into the lower ends of the housing and baffle cylinder as shown, the form of the latter being suitably altered for the purpose. A slight clearance 66 between the drum and housing permits free rotation of the former with respect to the latter in the direction of the arrow as the machine is moved forward and during such rotation the drum constantly carries small quantities of the powder downwardly from the housing for deposition upon the article being tested. The agitator shown in the preceding figures is preferably not employed when this form of distributor is used and the oscillating means therefor may similarly be eliminated.

It is thus evident that our invention provides a convenient method and machine for electro-magnetically furnishing a readily visible indication of sub-surface flaws in a welded pipe or other article formed of magnetic material without subjecting it to any treatment resulting in permanent damage. Moreover, the said machine may be so constructed as to be readily handled by a single operative with relatively great ease and rapidity while the expense of operation is substantially negligible, consisting principally of the cost of the relatively small amount of electricity required to operate the motor and magnet since a large part of the testing material, i. e. para-magnetic or other suitable powder may be reused substantially indefinitely. Moreover, while the machine to which we have herein more particularly referred is of a portable character and primarily intended to be transferred from one article to be tested to another and moved therealong in the manner described, it will be apparent that the machine may be maintained in a fixed or substantially fixed position and the article moved instead or that both the machine and the article may be moved relatively to each other, while, if preferred, the principles of the machine may be embodied in one of non-portable form designed for permanent location at any point convenient for testing the articles.

Furthermore, while we have herein illustrated and described certain embodiments of the machine of our invention with some particularity, it will be understood that we do not intend to limit or confine ourselves specifically thereto as changes and modifications may be made either as just explained or in other ways if desired and/or other apparatus employed for the performance of our method of testing if preferred, without departing from the spirit and scope of the invention defined in the appended claims.

Having thus described our invention, we claim and desire to protect by Letters Patent of the United States:

1. A testing machine of the class described comprising a hopper adapted to contain a powder susceptible to the influence of magnetic flux, means for progressively discharging said powder from the hopper upon the article to be tested, an electromagnet carried by the machine adjacent the hopper operative to create a magnetic flux in said article, and suction means having an intake nozzle disposed adjacent the poles of the magnet.

2. A testing machine of the class described comprising a hopper adapted to contain a powder susceptible to the influence of magnetic flux, means for progressively discharging said powder from the hopper upon the article to be tested, an electromagnet carried by the machine adjacent the hopper operative to create a magnetic flux in said article in the vicinity of said discharged powder particles, suction means having an intake nozzle disposed within the field of the magnet, and means operative to contemporaneously actuate said discharging means and said suction means.

3. A testing machine of the class described comprising means for distributing a powder susceptible to the influence of magnetic flux, a magnetic flux generator operative to magnetize the article to be tested in an area subjacent the distributed powder, means for maintaining said flux generator in rigidly assembled relation with the distributor, and suction means operative to return at least a portion of the distributed powder to the hopper preparatory to redistribution.

4. In a testing machine of the class described, means for distributing a powder susceptible to the influence of magnetic flux comprising a cylindrical housing, a baffle cylinder disposed within said housing and spaced from the walls thereof, a spiral fin surrounding said cylinder within the housing, a filter disposed within the cylinder operative to separate solid particles from air passing therethrough, means disposed beneath the housing providing a hopper adapted to receive said solid particles and having a discharge port, means operative to feed said particles through the port, means operative to subject the discharged particles to the action of a magnetic flux, and means for thereafter returning at least a portion of said particles to the housing.

5. In a testing machine of the class described, an electromagnet having its poles disposed in spaced relation and adapted for contact with an article to be tested, means for progressively depositing a para-magnetic powder on the surface of said article adjacent said poles, and means disposed adjacent the poles operative to remove at least a portion of said powder from the surface of said article while said powder is being subjected to the magnetic flux between said poles.

6. A testing machine of the class described comprising a U-shaped electromagnet having its poles adapted for contact with the article to be tested, means for distributing a powder susceptible to the influence of magnetic flux disposed adjacent the magnet operative to deposit a layer of powder on the surface of said article in advance of the magnet during relative progressive movement between the machine and said surface, suction means having a nozzle terminating adjacent the magnet poles operative to create a current of air of sufficient intensity to entrain at least a portion of the particles of powder deposited from the distributing means while said particles are subjected to the magnetic flux created by the magnet and means for receiving said current from the suction means operative to remove the entrained particles therefrom preparatory to their return to the distributing means.

7. A testing machine of the class described comprising a housing adapted to contain a powder susceptible to the influence of magnetic flux, means cooperative therewith to effect substantially uniform continuous discharge of powder therefrom, suction means disposed in spaced relation to the housing comprising an inlet nozzle adjacent the surface of the article to be tested and an exhaust duct secured to and communicating with the housing operative to induce a current of air through the nozzle and duct of sufficient strength to entrain particles of the distributed powder, an electromagnet supported by said duct having its poles disposed adjacent the inlet nozzle and adapted to contact said surface, and means associated with the housing for separating said entrained particles from said current.

8. A method of testing articles of magnetic material which comprises the steps of depositing a layer of finely divided para-magnetic material upon the surface of the article, thereafter subjecting said surface to the passage of a magnetic flux and simultaneously removing from said surface the particles of para-magnetic material least strongly influenced by the flux.

9. A method of producing visible indications of sub-surface flaws in articles of magnetic material which comprises the steps of progressively depositing para-magnetic particles upon a surface of said article, thereafter subjecting that portion of the article on which said particles are deposited to the passage of magnetic flux to thereby effect segregation of said particles and simultaneously subjecting the latter to a current of air of sufficient strength to remove at least a part of the particles.

10. In a method of testing to determine sub-surface conditions in magnetic material, the steps of depositing para-magnetic powder on the surface of the article being tested, then subjecting the portions thereof beneath said powder to the passage of magnetic flux to segregate particles of the powder adjacent areas of relatively low magnetic permeability and simultaneously removing other particles from said surface adjacent areas of relatively high magnetic permeability.

11. In a method of testing to determine sub-surface conditions in magnetic material, the steps of magnetically segregating quantities of para-magnetic powder on the surface of the article being tested adjacent areas where the subjacent magnetic flux is relatively dense, and simultaneously removing portions of the powder from said surface adjacent areas where the subjacent flux is relatively less dense.

12. A method of detecting sub-surface flaws in magnetic material which comprises the steps of progressively forming a layer of para-magnetic powder on the surface of the material, creating a magnetic flux through the material beneath the area covered by the layer, and moving the field traversed by said flux in coordinated relation with the point at which said layer is progressively formed while subjecting that portion of the layer above the field to suction sufficient to remove that portion of the particles of powder included therein which are least tenaciously held against the surface by the flux.

13. A method of producing visible indication of the presence of sub-surface flaws in magnetic material which comprises the steps of progressively distributing a layer of para-magnetic powder on the surface of the material, creating a magnetic flux through the material beneath said layer, progressively moving the field traversed thereby to maintain it in definite relation with the point at which said layer is progressively created, and simultaneously with the movement of said field subjecting the superjacent portion of the layer to a current of air of sufficient strength to entrain and carry with it from the surface of the material at least a portion of the particles forming the layer but insufficient to entrain and remove those particles tending to adhere to said surface in localized areas adjacent disturbances in said flux caused by sub-surface flaws in the material.

14. In a testing machine of the class described, the combination of a magnet, means for distributing a powder susceptible to the influence of magnetic flux on the article to be tested for subjection to the field of the magnet, and means interposed within said field operative to remove therefrom a portion of said powder.

15. In a testing machine of the class described, the combination with a U-shaped magnet, of distributing means operative to continuously discharge a powder susceptible to the influence of magnetic flux upon the article to be tested for subjection to the field of the magnet, and means interposed in said field adapted to continuously remove therefrom at least a portion of the powder discharged from the distributing means and effect its return thereto.

RICHARD H. EURICH.
RICHARD AUBREY, Jr.